United States Patent
Zhou et al.

(10) Patent No.: US 12,113,629 B2
(45) Date of Patent: Oct. 8, 2024

(54) PRIORITIZATION BETWEEN A SCHEDULING REQUEST AND HARQ FEEDBACK

(71) Applicant: QUALCOMM Incorporated, San Diego, CA (US)

(72) Inventors: Yan Zhou, San Diego, CA (US); Tao Luo, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 17/037,434

(22) Filed: Sep. 29, 2020

(65) Prior Publication Data

US 2021/0105100 A1    Apr. 8, 2021

Related U.S. Application Data

(60) Provisional application No. 62/911,146, filed on Oct. 4, 2019.

(51) Int. Cl.
| | |
|---|---|
| *H04L 1/1829* | (2023.01) |
| *H04B 7/08* | (2006.01) |
| *H04L 1/1812* | (2023.01) |
| *H04L 5/00* | (2006.01) |
| *H04W 72/044* | (2023.01) |
| *H04W 72/1263* | (2023.01) |
| *H04W 72/53* | (2023.01) |

(52) U.S. Cl.
CPC ........... *H04L 1/1854* (2013.01); *H04B 7/088* (2013.01); *H04L 1/1819* (2013.01); *H04L 5/0055* (2013.01); *H04W 72/046* (2013.01); *H04W 72/1263* (2013.01); *H04W 72/53* (2023.01)

(58) Field of Classification Search
None
See application file for complete search history.

(56) References Cited

U.S. PATENT DOCUMENTS

| | | | |
|---|---|---|---|
| 2019/0103951 A1* | 4/2019 | Park | H04W 72/0446 |
| 2019/0253207 A1* | 8/2019 | Li | H04L 5/0078 |
| 2019/0387383 A1* | 12/2019 | Ye | H04W 4/80 |
| 2020/0120704 A1* | 4/2020 | Wang | H04L 5/0091 |

(Continued)

OTHER PUBLICATIONS

International Search Report & Written Opinion dated Jan. 25, 2021 from corresponding PCT Application No. PCT/US2020/053646.

(Continued)

*Primary Examiner* — Marcus Smith
(74) *Attorney, Agent, or Firm* — Arent Fox, LLP (57) ABSTRACT

A method, a computer-readable medium, and an apparatus are provided for wireless communication at a user equipment (UE). The apparatus identifies an overlap between resources for transmitting a scheduling request (SR) and a transmission occasion for transmitting hybrid automatic repeat request (HARQ) feedback. The apparatus determines whether to transmit the SR or the HARQ feedback to a base station based on at least one of a type of the SR, a relationship between a first beam for an uplink control channel and a second beam for downlink communication, or a content of the HARQ feedback. Then, the apparatus transmits the SR or the HARQ feedback based the determination.

26 Claims, 8 Drawing Sheets

(56) References Cited

U.S. PATENT DOCUMENTS

| | | | | |
|---|---|---|---|---|
| 2020/0196327 | A1* | 6/2020 | Zhang | H04W 72/21 |
| 2020/0205182 | A1* | 6/2020 | Yamamoto | H04L 5/0051 |
| 2020/0396759 | A1* | 12/2020 | Baldemair | H04B 7/0413 |
| 2021/0007119 | A1* | 1/2021 | Li | H04W 72/0446 |
| 2021/0144703 | A1* | 5/2021 | Jung | H04B 7/0695 |
| 2021/0410165 | A1* | 12/2021 | Xiong | H04W 72/1242 |
| 2022/0053483 | A1* | 2/2022 | Yoshioka | H04W 72/0413 |
| 2022/0078768 | A1* | 3/2022 | El Hamss | H04L 5/0055 |
| 2022/0255669 | A1* | 8/2022 | Yin | H04L 1/1812 |

OTHER PUBLICATIONS

Asia Pacific Telecom: Discussion on Multi-beam Operations, 3GPP Draft; R1-1908928 Enhancements On Mul ti-Beam Operations V01, 3rd Generation Partnership Project (3GPP), Mobile Competence Centre .• 650, Route Des Lucioles .• F-06921 Sophia Anti Polis Cedex • France; vol. RAN WG1, No. Prague, CZ; Aug. 26, 2019-Aug. 30, 2019 Aug. 16, 2019 (Aug. 16, 2019), XP051765535, Retrieved from the Internet: URL:http://www.3gpp.org/ftp/tsg_ran/WG1_RL1/TSGR1_98/Docs/R1-1908928.zip [retrieved on Aug. 16, 2019] p. 1, section 1; p. 5, last par; p. 5, par. below last Agreement; p. 6, Proposal 5; p. 6, Proposal 6.

* cited by examiner

PRIORITIZATION BETWEEN A SCHEDULING REQUEST AND HARQ FEEDBACK

CROSS REFERENCE TO RELATED APPLICATIONS

This application claims priority to U.S. Provisional Application No. 62/911,146 titled "PRIORITIZATION BETWEEN A SCHEDULING REQUEST AND HARQ FEEDBACK," filed Oct. 4, 2019, which is assigned to the assignee hereof, and incorporated herein by reference in its entirety.

BACKGROUND

Technical Field

The present disclosure relates generally to communication systems, and more particularly, to wireless communication including a scheduling request (SR).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus identifies an overlap between resources for transmitting a scheduling request (SR) and a transmission occasion for transmitting hybrid automatic repeat request (HARQ) feedback. The apparatus determines whether to transmit the SR or the HARQ feedback to a base station based on at least one of a type of the SR, a relationship between a first beam for an uplink control channel and a second beam for downlink communication, or a content of the HARQ feedback. Then, the apparatus transmits the SR or the HARQ feedback based the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
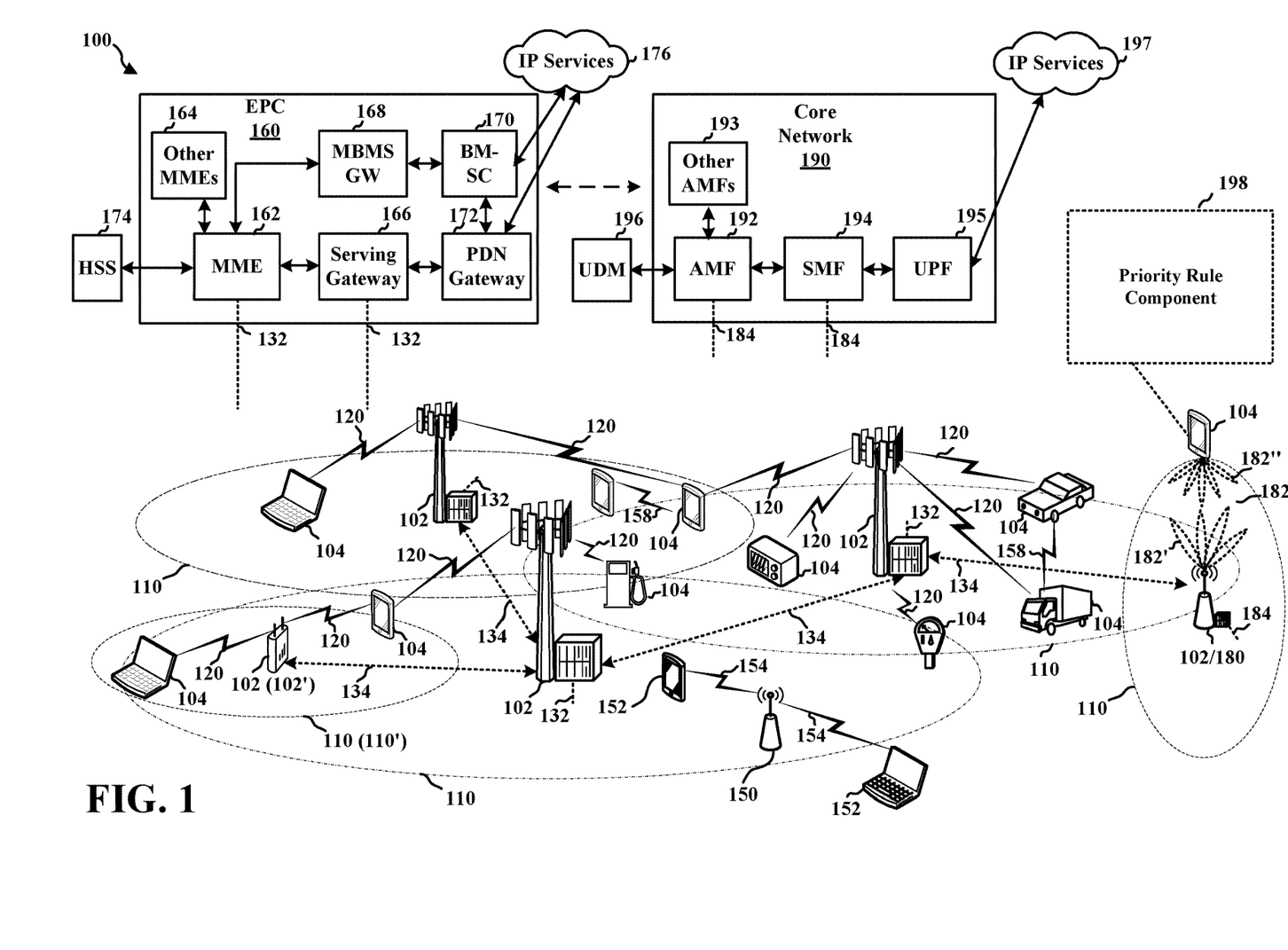
FIG. 1 is a diagram illustrating an example of a wireless communications system and an access network.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management

Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a priority rule component 198 that is configured to determine whether to transmit the SR or the HARQ feedback to a base station when an overlap is identified between resources for transmitting an SR and a transmission occasion for transmitting HARQ feedback. The priority rule component 198 may be configured to perform the determination based on at least one of a type of the SR, a relationship between a first beam for an uplink control channel and a second beam for downlink communication, or a content of the HARQ feedback. The UE 104 may then transmit the SR or the HARQ feedback based on the determination from the priority rule component 198. Although the following description may be focused on 5G NR, the concepts described herein may be applicable to other similar areas, such as LTE, LTE-A, CDMA, GSM, and other wireless technologies.

Figure 2A:
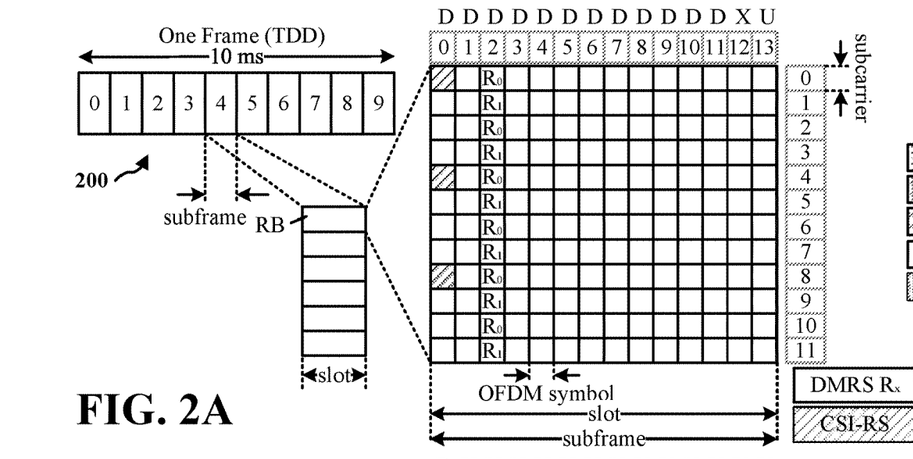
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2B:
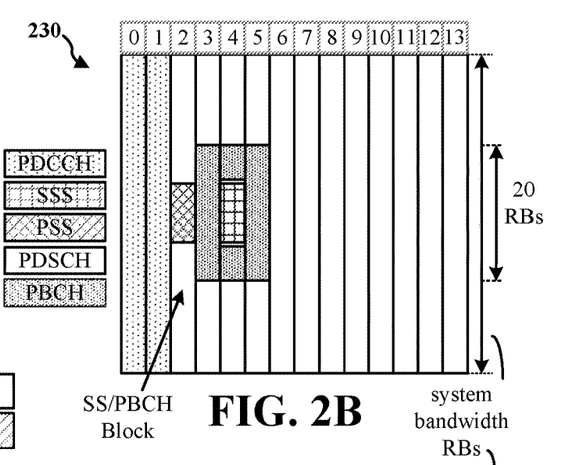
Figure 2C:
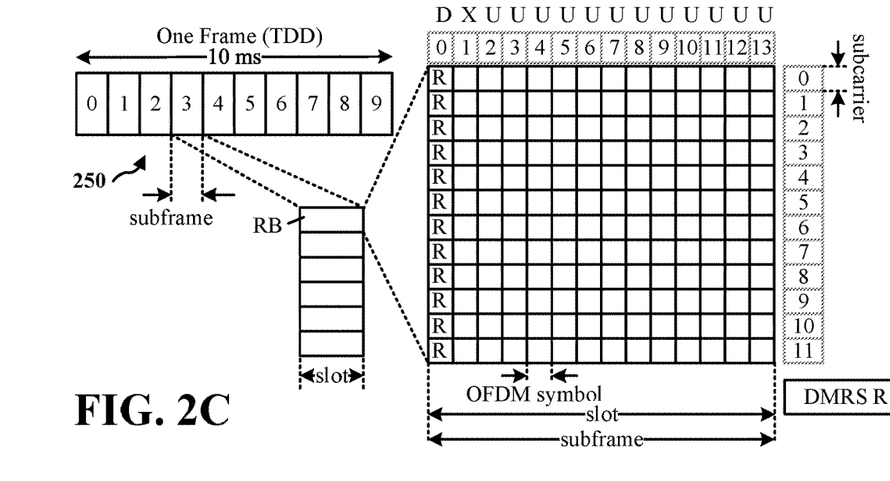
Figure 2D:
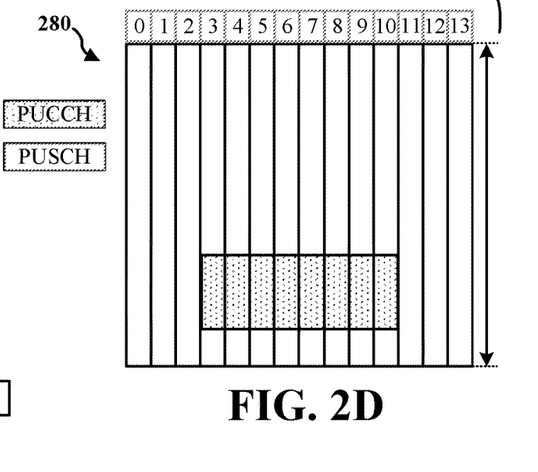

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
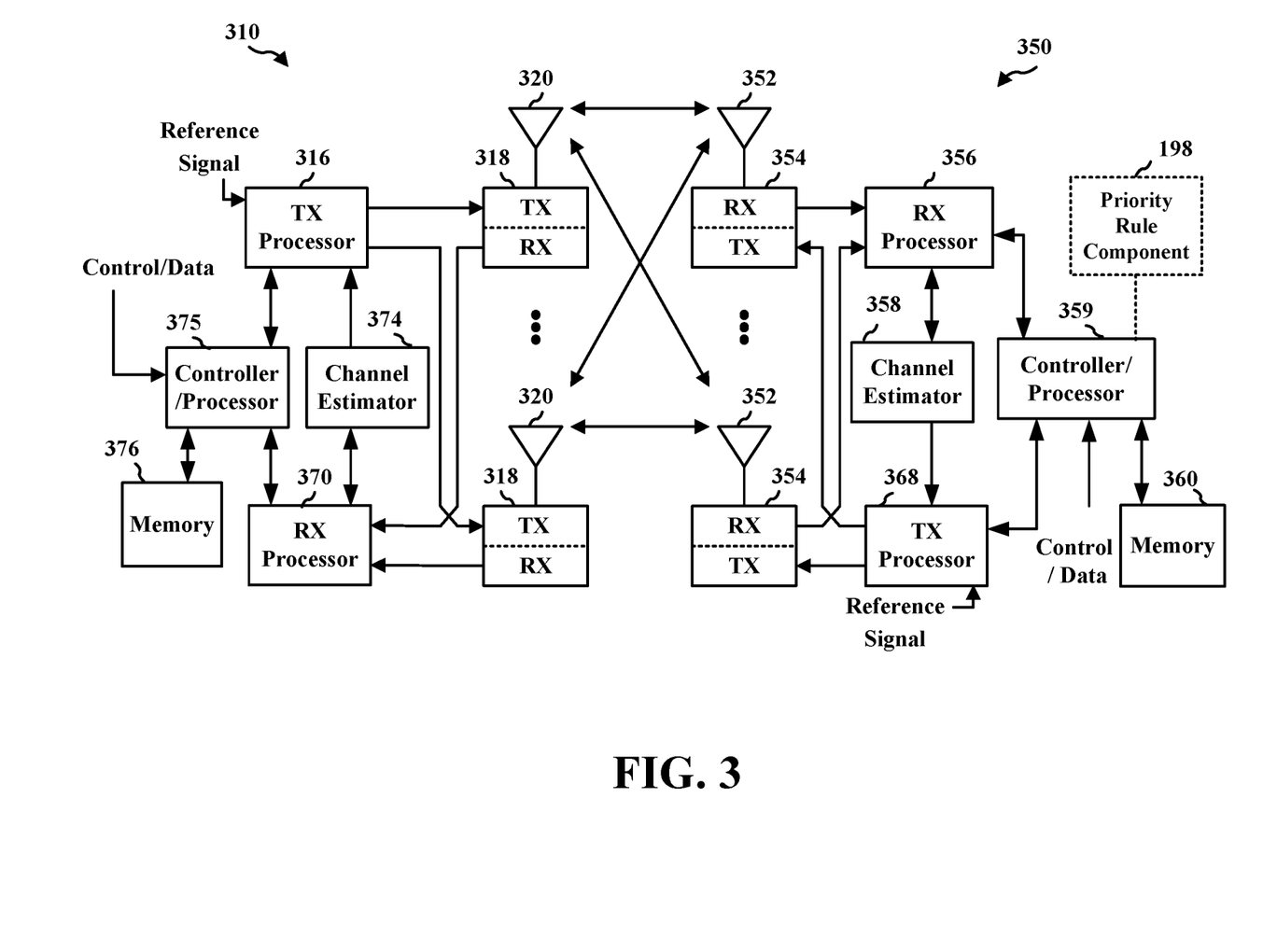
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the priority rule component 198 of FIG. 1.

A UE may send a scheduling request (SR) message to a network to request that the network send the UE an uplink grant so that the UE can transmit PUSCH, such as data. The SR may be sent on a PUCCH. Some PUCCH formats may be used to transmit SR, and other PUCCH formats might not carry SR. Once a base station receives an SR from the UE, the base station may respond by sending an uplink grant to the UE allocating resources to the UE for a PUSCH transmission. The timing and PUCCH configuration for SR transmissions from a UE may be configured, e.g., based on an RRC message from the base station. A UE may be configured to transmit K PUCCHs for a respective K scheduling requests in a slot. K may be an integer number that is based on a scheduling request resource identifier (ID). At least one of the SR transmission occasions, e.g., a time and frequency resource for one of the K SRs in the slot, may overlap with a transmission occasion for a PUCCH that includes HARQ-ACK information from the UE or with a transmission of a PUCCH with a CSI report from the UE. The UE may determine which PUCCH to transmit.

Figure 4:
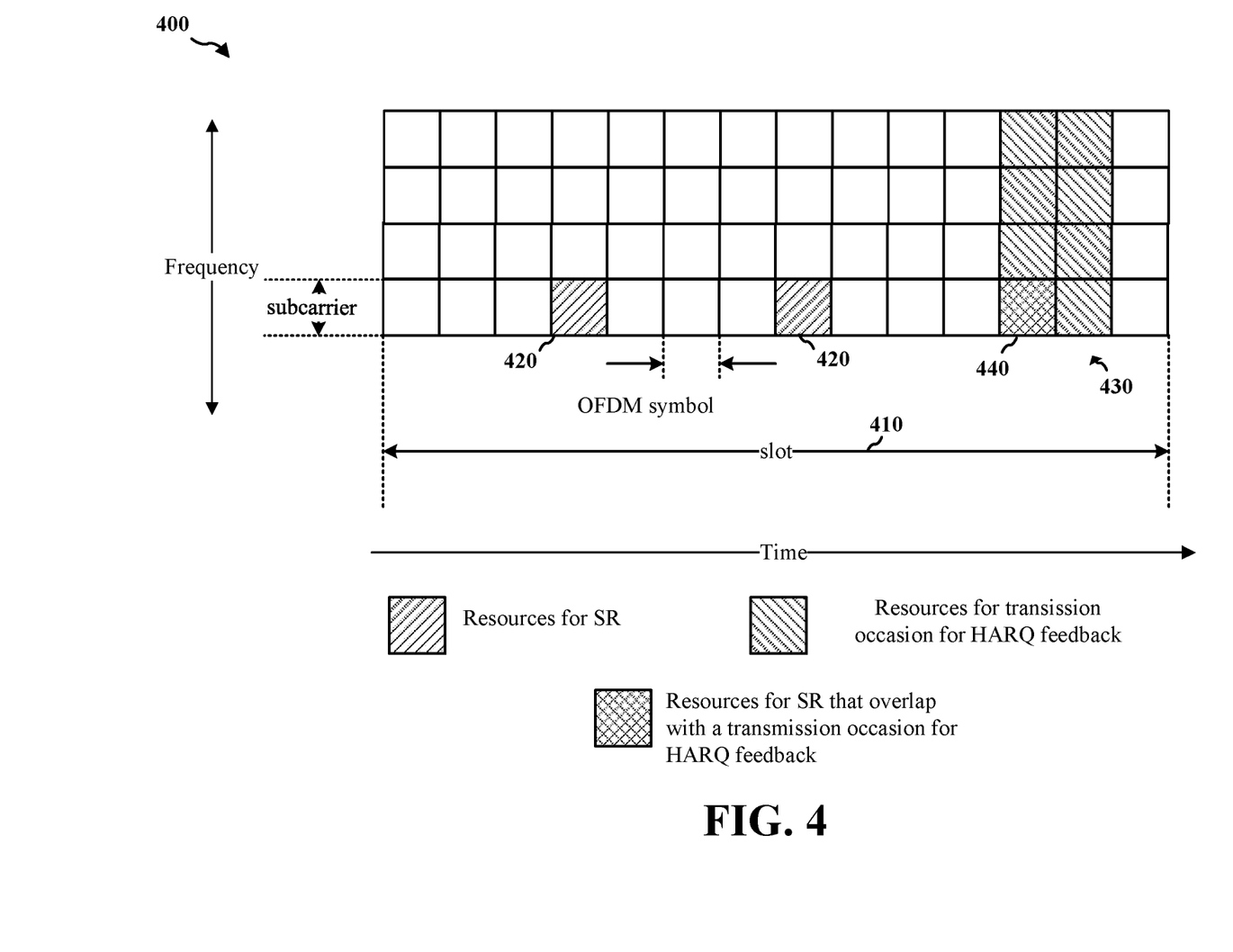
FIG. 4 illustrates an example of resources in a slot for a UE.

FIG. 4 illustrates an example of resources 400 configured for a UE in a slot 410. FIG. 4 illustrates resources, e.g., in time and frequency, for an SR transmission from the UE in a slot. FIG. 4 also illustrates that resources for the SR transmission 420 may overlap, at least partially, with a transmission occasion 430 for a PUCCH including HARQ feedback in the slot 410.

If a UE has a scheduling request using PUCCH format 0 that would overlap with a transmission occasion for HARQ feedback using PUCCH format 1, the UE may drop the SR transmission 420. For example, if a UE would transmit a positive SR or a negative SR in a resource 440 using PUCCH format 0 and would also transmit HARQ-ACK information bits in the resource 440 using PUCCH format 1 in a slot, the UE may be limited to transmitting only a PUCCH with the HARQ-ACK information bits in the resource using PUCCH format 1.

However, the UE may have different types of SR to transmit to a base station, and the UE may have different information to convey in the HARQ feedback. A prioritization rule that prioritizes HARQ feedback over scheduling requests may cause the UE to drop a SR request that is more important to communication between the UE and the base station than the HARQ feedback. For example, the SR may comprise an SR for beam failure recovery (BFR). The SR for BFR may request beam failure recovery information to be transmitted on a PDCCH. In some examples, the SR may include a dedicated SR for BFR, such as BFR for a secondary cell (SCell). The present disclosure enables a UE to consider the urgency of a SR, such as for BFR for a SCell, relative to the HARQ feedback for a transmission occasion that overlaps with the resources for the SR in a slot.

For example, the UE may consider whether an uplink PUCCH beam follows a downlink beam for the UE in order to determine whether to prioritize an SR in a resource of a slot that would overlap with a transmission occasion for HARQ feedback in the slot. For example, if the uplink PUCCH beam does not follow the downlink beam, the UE may transmit the HARQ feedback and drop the SR. If the uplink PUCCH beam does not follow the downlink beam, the uplink beam may still be reliable for uplink communication. Accordingly, the HARQ feedback to the base station using the PUCCH beam may be more useful than an SR. The UE may consider whether the uplink PUCCH beam follows any of the downlink beams for the UE. If the uplink PUCCH beam does follow the downlink beam, the UE may instead prioritize the SR over the HARQ feedback. For instance, in the event of beam failure, the uplink PUCCH beam that follows the downlink beam may also fail. Accordingly, the SR for BFR may be more useful than the HARQ feedback for restoring communications. Thus, the UE may transmit the SR and drop the HARQ feedback. An uplink beam may be considered to follow a downlink beam if a spatial relation for the uplink beam is the same as for the downlink beam. For example, the uplink beam may be considered to follow the downlink beam if a spatial relation for the uplink beam matches a quasi co-location (QCL) Type D reference signal (RS) for the downlink beam. The uplink beam may be referred to as quasi-co-located with the downlink beam when the spatial relation for the uplink beam matches the QCL Type D RS for the downlink beam.

Figure 5:
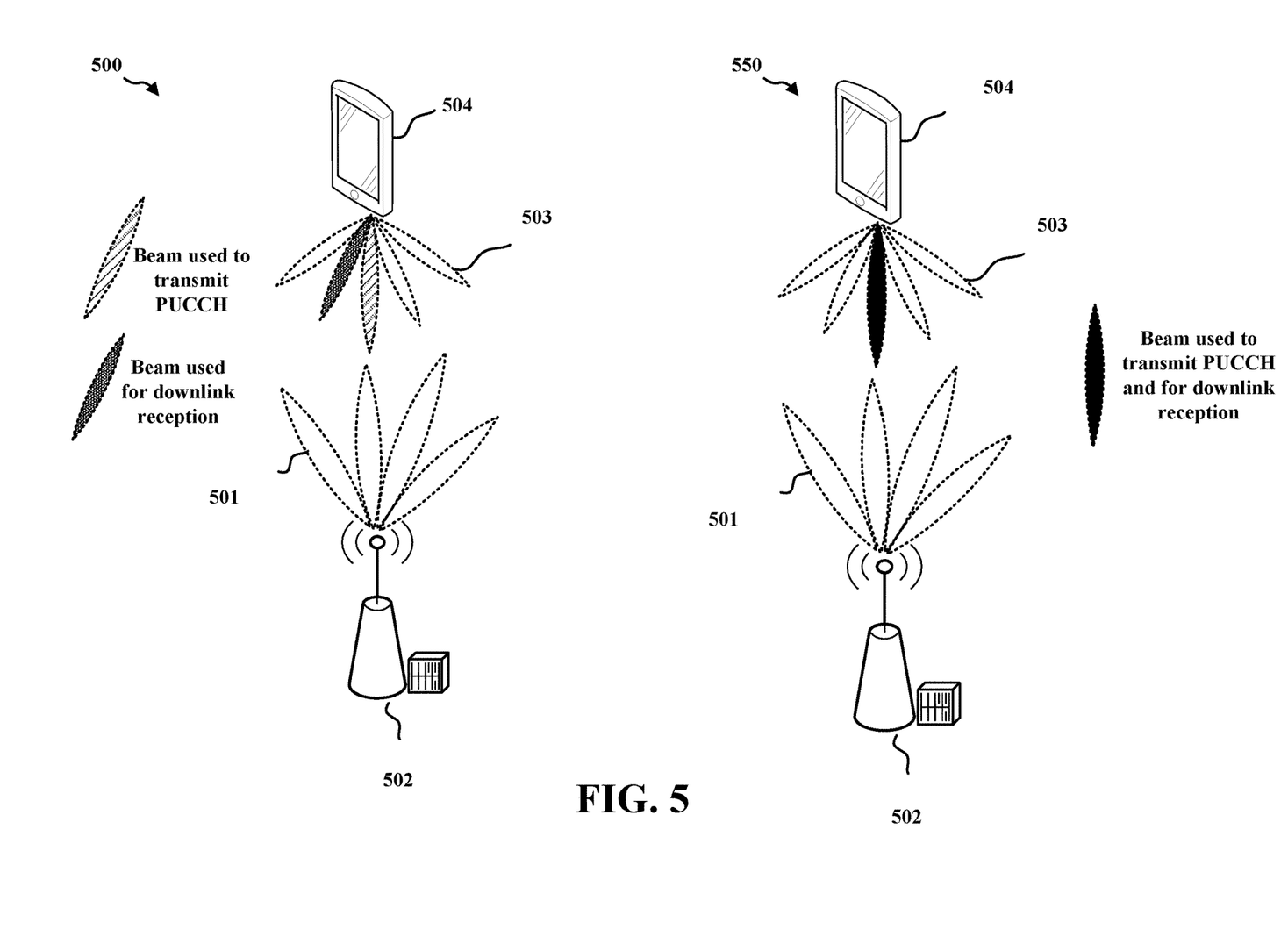
FIG. 5 illustrates an example of communication between a UE and a base station using directional beams.

FIG. 5 illustrates two examples of wireless communication between a base station 502 and a UE 504 based on beamforming. The base station 502 may use at least one directional beam 501 to transmit communication to the UE 504 and/or to receive communication from the UE 504. Similarly, the UE may use at least one directional beam 503 to transmit communication to the base station 502 and/or to receive communication from the base station 502. In the example of reciprocal beams 550, the uplink beam for PUCCH for the UE follows the downlink beam for the UE. The beams are the same, and share a spatial relation. In the example 500, the UE uses a different beam to transmit PUCCH and to receive downlink communication from the base station. FIG. 5 is a diagram that merely illustrates the concept of an uplink beam and a downlink beam sharing a spatial relation. The concepts presented herein may be applied for any number of beams, any beam width, etc.

The uplink PUCCH beam, which the UE uses to determine whether the uplink PUCCH follows a downlink beam for the UE, may be the same as the PUCCH beam for the HARQ feedback. Therefore, the UE may use QCL information for the uplink beam for PUCCH for the HARQ feedback to determine whether to prioritize the HARQ feedback or the SR.

The SR may include a BFR SR. The UE may determine the priority based, in part, on the type of SR. For example, the UE may prioritize HARQ-ACK information over a BFR SR if the uplink PUCCH beam does not follow the downlink beam, and the UE may prioritize the BFR SR if the uplink PUCCH beam does follow the downlink beam. The prioritization rule may be applied to other types of SR, e.g., a regular or non-dedicated SR. In some examples, the UE may use the determination about whether the uplink PUCCH beam follows the downlink beam to determine whether to prioritize any SR over the HARQ feedback.

The downlink beam, that the UE uses to determine whether the uplink PUCCH follows the downlink beam, may be a downlink beam for a control resource set (CORESET) monitored for BFR on a failed SCell. The CORESET for BFR may be defined by a recovery search space ID and may be associated with a transmission configuration indicator (TCI) state corresponding to the downlink beam and including QCL information. Therefore, the UE may use the QCL information for a downlink beam used to monitor for BFR on a failed SCell to determine whether to prioritize a SR for BFR for the SCell or to prioritize HARQ feedback. For example, if the SR is a dedicated SR for BFR, such as for an SCell, the UE may prioritize HARQ feedback when an uplink PUCCH beam for the HARQ feedback does not follow, e.g., does not share a QCL type D spatial relation, with a downlink beam that the UE uses to monitor a CORESET for BFR for the SCell. Thus, the UE may drop the SR for BFR for the SCell and may instead transmit the HARQ feedback. If the PUCCH beam for the HARQ feedback does follow, e.g., shares a QCL type D spatial relation, with the downlink beam that the UE uses to monitor the CORESET for BFR for the SCell, the UE may instead transmit the SR for BFR for the SCell and may drop the HARQ feedback.

The UE may use the format for the SR and/or the format for the HARQ feedback to determine whether to prioritize the SR or the HARQ feedback. For example, the UE may apply the prioritization concepts presented herein to determine whether to drop a PUCCH for SR using format 0. In another example, the UE may apply the prioritization concepts presented herein to determine whether to drop a PUCCH for SRS using another format. The UE may apply the prioritization concepts presented herein to determine whether to drop a PUCCH for HARQ feedback using format 1. In another example, the UE may apply the prioritization concepts presented herein to determine whether to drop a PUCCH for HARQ feedback using another format.

As an example, if a UE would transmit an SR for BFR for an SCell using PUCCH format 0 that would overlap in a slot with a transmission occasion for HARQ feedback using format 1, the UE may send the HARQ feedback, and drop the SR for BFR for the SCell, if the uplink PUCCH beam for the HARQ feedback does not follow the downlink beam that the UE uses to monitor a CORESET for BFR for the SCell. If the uplink PUCCH beam for the HARQ feedback does follow the downlink beam that the UE uses to monitor the CORESET for BFR for the SCell, the UE may instead send the SR for BFR for the SCell and may drop the HARQ feedback.

In some examples, the UE may apply a different prioritization rule based on whether an uplink beam for PUCCH shares a spatial relation with a downlink beam for the UE. For example, if the uplink PUCCH beam does not follow the downlink beam, the UE may transmit the SR and drop the HARQ feedback. If the uplink PUCCH beam does follow the downlink beam, the UE may instead prioritize the HARQ feedback over the SR. Thus, the UE may transmit the HARQ feedback and drop the SR.

In some examples, the UE may consider the content of the HARQ feedback in order to determine whether to prioritize the SR or the HARQ feedback. For example, when the UE would transmit SR using resources that overlap with a transmission occasion for HARQ feedback, the UE may prioritize the HARQ feedback if the HARQ feedback includes at least one positive acknowledgment (ACK). Thus, if the HARQ feedback includes an ACK, the UE may transmit the HARQ feedback and may drop the SR. If the HARQ feedback does not include a positive acknowledgment, e.g., only includes NACK feedback, the UE may prioritize the SR over the HARQ feedback. Thus, the UE may transmit the SR and may drop the NACK feedback. The base station may assume NACK for the HARQ feedback that is dropped. The prioritization rule based on the content of the HARQ feedback may apply for a particular type of SR, such as an SR for BFR or an SR for BFR for an SCell. In other examples, the prioritization rule based on the content of the HARQ feedback may apply for any type of SR. The prioritization rule may be based on a format for the SR and/or the HARQ feedback. For example, the UE may send HARQ feedback using format 1 that includes at least one ACK and may drop an overlapping SR using format 0. Otherwise, if the HARQ feedback using format 1 does not include an ACK, the UE may transmit the SR using format 0 and may drop the HARQ feedback.

Figure 6:
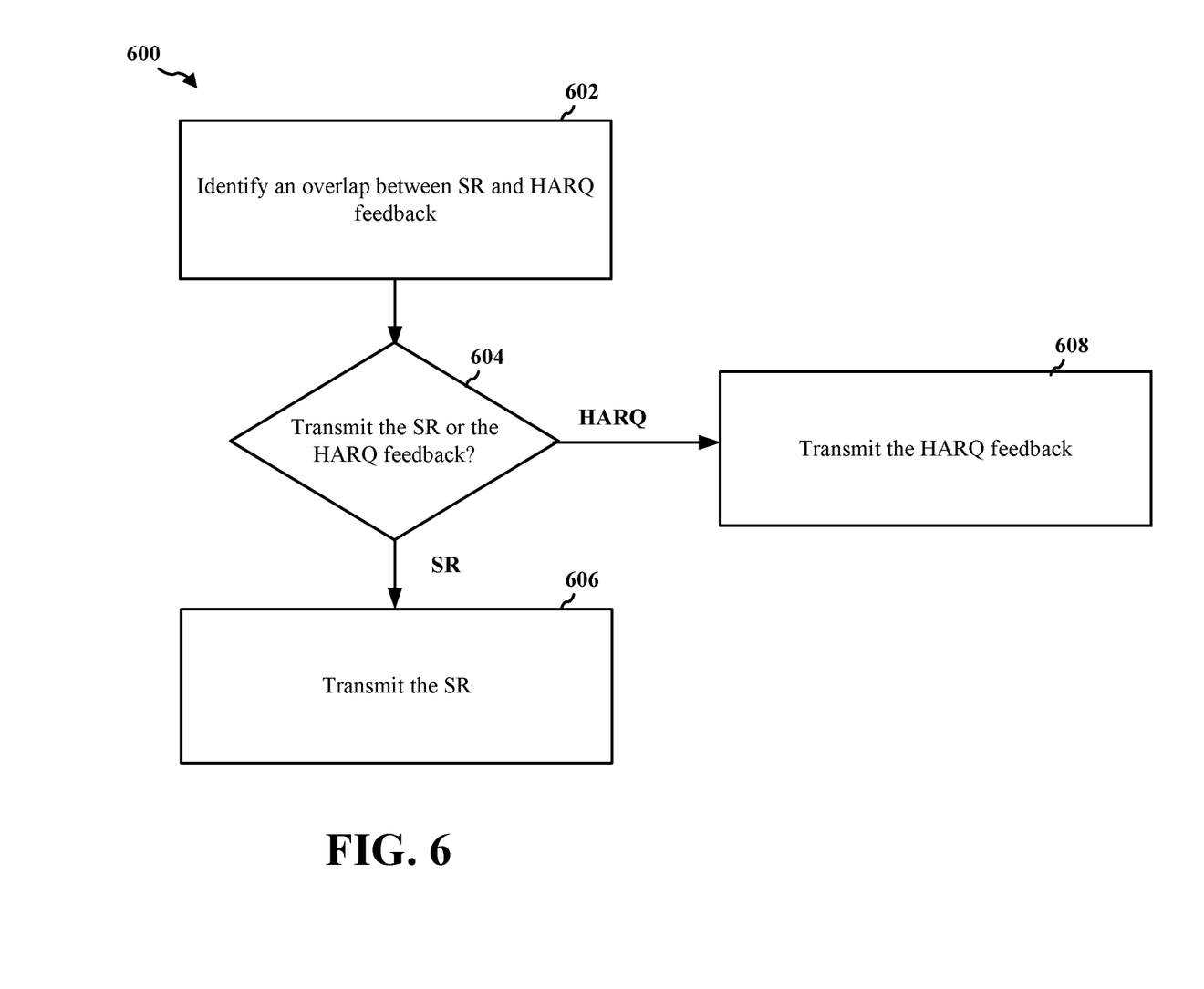
FIG. 6 is a flowchart of a method of wireless communication.

FIG. 6 is a flowchart 600 of a method of wireless communication. The method may be performed by a UE (e.g., the UE 104, 350, 504; the apparatus 702/702'; the processing system 814, which may include the memory 360 and which may be the entire UE 350 or a component of the UE 350, such as the TX processor 368, the RX processor 356, and/or the controller/processor 359). The method may enable the UE to consider the urgency of an SR when determining whether to prioritize the SR or the HARQ feedback.

At 602, the UE identifies an overlap between resources for transmitting a SR and a transmission occasion for transmitting HARQ feedback. For example, as described in connection with FIG. 4, resources for an SR transmission 420 within a slot 410 may overlap in time and or frequency with a transmission occasion 430 for a PUCCH that includes HARQ feedback. For example, the resources for the SR transmission 420 may overlap with the transmission occasion 430 at resource 440. The identification may be performed, e.g., by the identification component 708 of the apparatus 702.

At 604, the UE determines whether to transmit the SR or the HARQ feedback to a base station based on at least one of a type of the SR, a relationship between a first beam for an uplink control channel and a second beam for downlink communication, or a content of the HARQ feedback. The determination may be performed, e.g., by the determination component 710 of the apparatus 702.

The UE may determine to transmit the HARQ feedback if the first beam for the uplink control channel is not QCL, e.g., does not share a QCL Type D spatial relation, with the second beam for the downlink communication. Thus, the UE may transmit the SR, at 606. The UE may determine to transmit the SR if the first beam for the uplink control channel is QCL with the second beam for the downlink communication. Thus, the UE may transmit the HARQ feedback, at 608.

In another example, the UE may determine to transmit the SR if the first beam for the uplink control channel is not QCL with the second beam for the downlink communication. The UE may determine to transmit the HARQ feedback if the first beam for the uplink control channel is quasi-co-located with the second beam for the downlink communication.

The UE may determine whether to transmit the SR or the HARQ feedback to the base station based on the relationship between the first beam for the uplink control channel for the HARQ feedback and the second beam for the downlink communication.

The UE may determine whether to transmit the SR or the HARQ feedback to the base station based on the relationship between the first beam for the uplink control channel and the second beam for the downlink communication. The second beam may be a downlink beam for a CORESET monitored for BFR on an SCell.

The SR may include a BFR SR, and the determination at 604 may be based at least in part on the type of the SR. For example, the UE may determine to transmit the SR based on the type of the SR being for BFR. The UE may determine to transmit the HARQ feedback based on the type of the SR being for BFR. Alternatively, the determination at 604 may be made for any type of SR.

The UE may determine whether to transmit the SR or the HARQ feedback further based on a format of a PUCCH for the SR or HARQ feedback. The UE may determine whether to transmit the SR or the HARQ feedback further based on the PUCCH for the SR being format 0. The UE may determine whether to transmit the SR or the HARQ feedback further based on the PUCCH for the HARQ feedback being format 1.

The UE may determine whether to transmit the SR or the HARQ feedback to the base station based the content of the HARQ feedback. The UE may determine to transmit the HARQ feedback if the HARQ feedback comprises a positive ACK. The UE may determine to transmit the SR if the HARQ feedback does not include a positive ACK.

Then, the UE transmits the SR or the HARQ feedback based the determination. For example, if the UE determines to prioritize the SR, the UE may transmit the SR at 606. The UE may drop or otherwise adjust the transmission of the HARQ feedback. The SR may be transmitted, e.g., by the SR component 712 of the apparatus 702.

If the UE determines to prioritize the HARQ feedback, the UE may transmit the HARQ feedback at 608. The UE may drop or otherwise adjust the transmission of the SR. The HARQ feedback may be transmitted, e.g., by the feedback component 714 of the apparatus 702.

Figure 7:
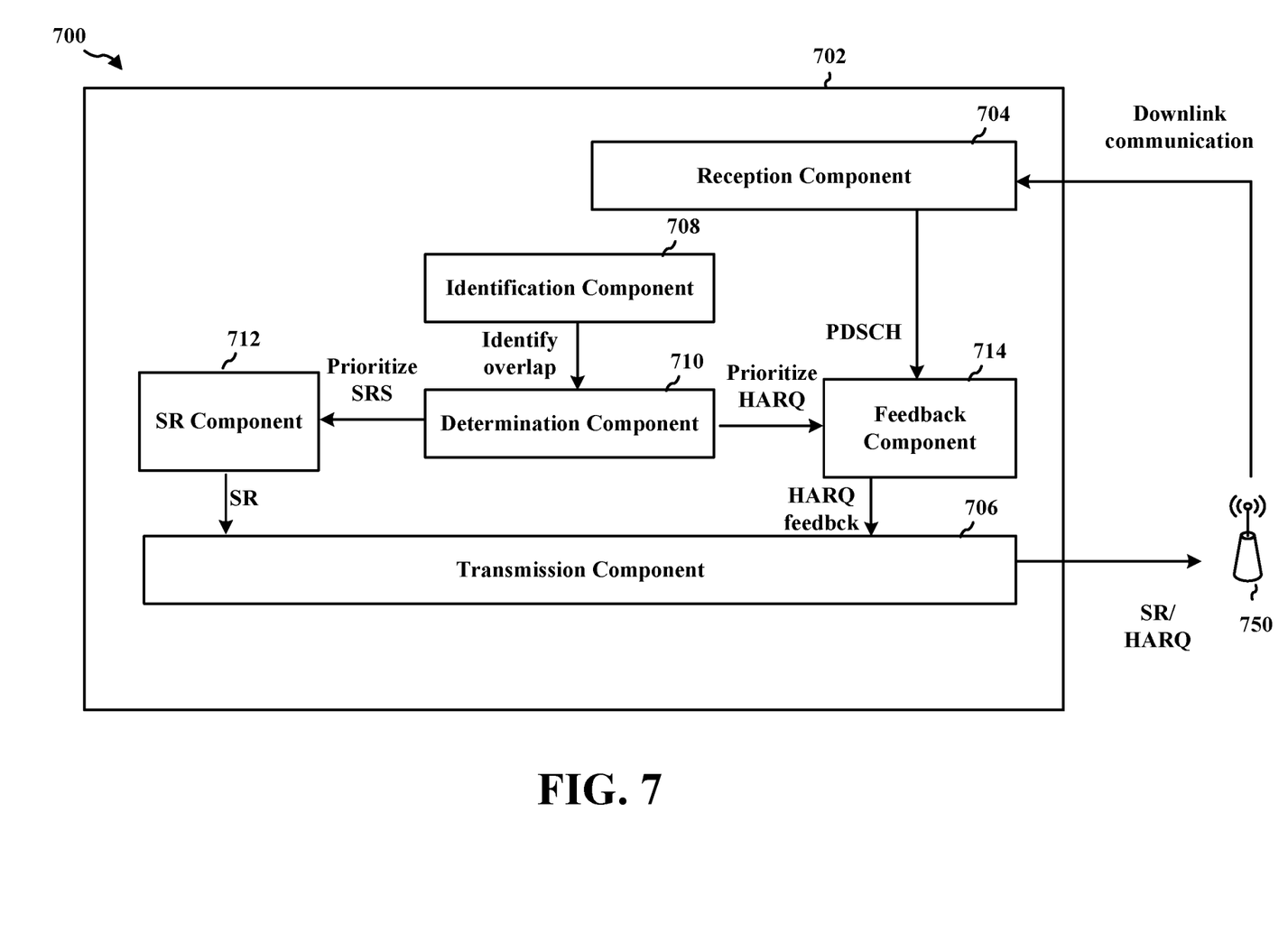
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus 702 may be a UE or a component of a UE. The apparatus 702 includes a reception component 704 that receives downlink communication from the base station 750 and a transmission component 706 that transmits uplink communication to the base station 750. The apparatus includes an identification component 708 that is configured to identify an overlap between resources for transmitting a SR and a transmission occasion for transmitting HARQ feedback, e.g., as described in connection with 602 in FIG. 6. The apparatus 702 includes a determination component 710 configured to determine whether to transmit the SR or the HARQ feedback to a base station based on at least one of a type of the SR, a relationship between a first beam for an uplink control channel and a second beam for downlink communication, or a content of the HARQ feedback, e.g., as described in connection with 604 in FIG. 6. The apparatus includes an SR component 712 configured to transmit an SR based on the determination, e.g., as described in connection with 606 in FIG. 6. The apparatus includes a feedback component 714 configured to transmit HARQ based on the determination, e.g., as described in connection with 608 in FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
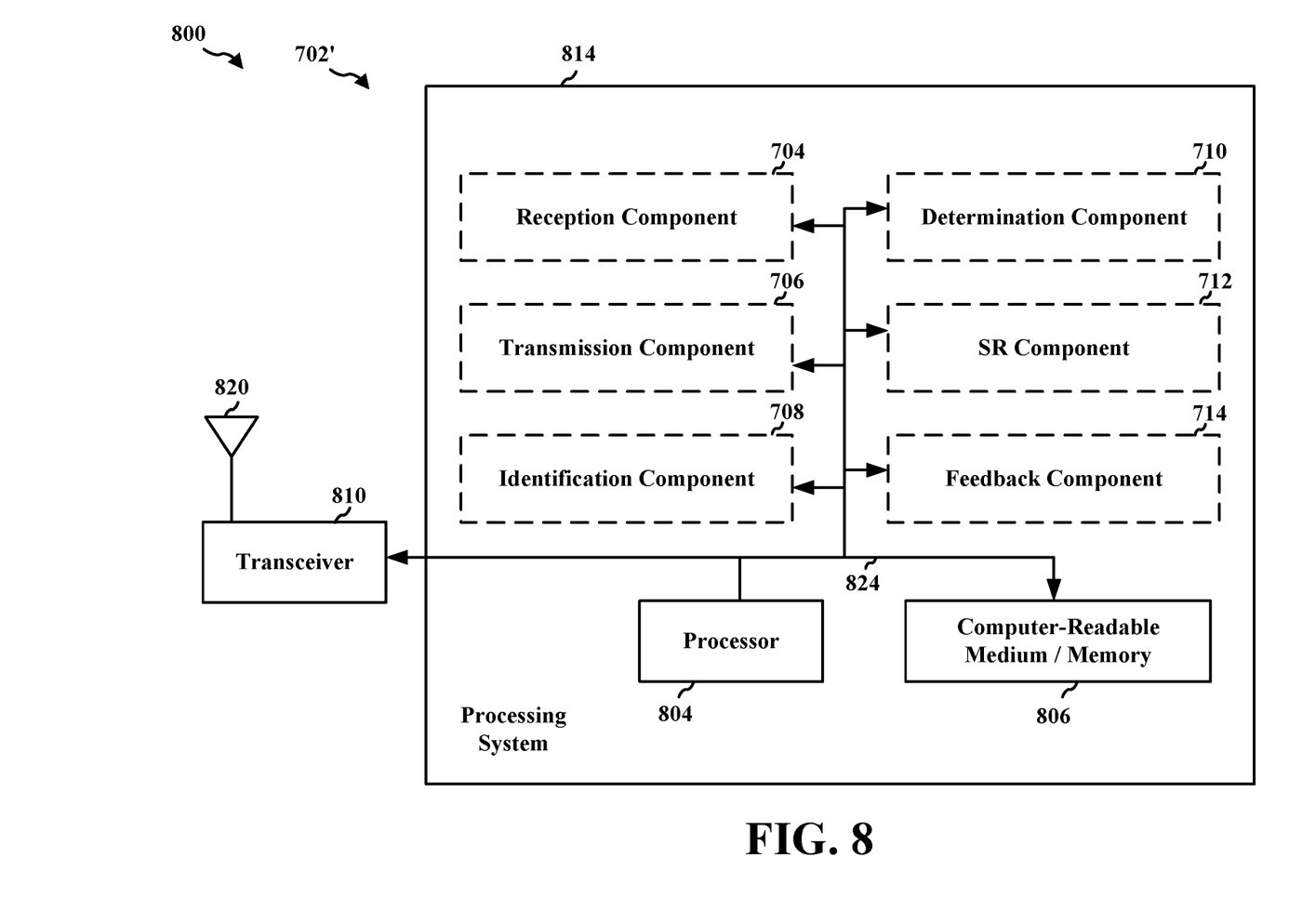
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for identifying an overlap between resources for transmitting a SR and a transmission occasion for transmitting HARQ feedback, means for determining whether to transmit the SR or the HARQ feedback to a base station based on at least one of a type of the SR, a relationship between a first beam for an uplink control channel and a second beam for downlink communication, or a content of the HARQ feedback, and means for transmitting the SR or the HARQ feedback based the determination. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    identifying an overlap between resources for transmitting a scheduling request (SR) and a transmission occasion for transmitting hybrid automatic repeat request (HARQ) feedback;
    determining which one of the SR or the HARQ feedback to transmit to a base station based on a relationship between a first beam for an uplink control channel for the HARQ feedback and a second beam for downlink communication; and
    transmitting the SR or the HARQ feedback based the determination,
    wherein if the relationship is the first beam for the uplink control channel does not follow the second beam for the downlink channel, the HARQ feedback is transmitted.

2. The method of claim 1, wherein the UE determines to transmit the HARQ feedback if the first beam for the uplink control channel is not quasi-co-located with the second beam for the downlink communication.

3. The method of claim 1, wherein the UE determines to transmit the SR if the first beam for the uplink control channel is quasi-co-located with the second beam for the downlink communication.

4. The method of claim 1, wherein the second beam comprises a downlink beam for a control resource set (CORESET) monitored for beam failure recovery (BFR) for a secondary cell (SCell).

5. The method of claim 1, wherein the SR comprises a beam failure recovery (BFR) SR.

6. The method of claim 5, wherein the UE determines to transmit the SR further based on a type of the SR being for BFR.

7. The method of claim 5, wherein the UE determines to transmit the HARQ feedback further based on a type of the SR being for BFR.

8. The method of claim 1, wherein the UE determines whether to transmit the SR or the HARQ feedback further based on a format of at least one of a physical uplink control channel (PUCCH) for the SR or the HARQ feedback.

9. The method of claim 8, wherein the UE determines whether to transmit the SR or the HARQ feedback further based on the PUCCH for the SR being format 0.

10. The method of claim 8, wherein the UE determines whether to transmit the SR or the HARQ feedback further based on the PUCCH for the HARQ feedback being format.

11. The method of claim 1, wherein the UE determines which one of the SR or the HARQ feedback to transmit to the base station based on whether the content of the HARQ feedback includes at least one positive acknowledgement.

12. The method of claim 11, wherein the UE determines to transmit the HARQ feedback in response to the content of the HARQ feedback including a positive acknowledgement (ACK).

13. The method of claim 11, wherein the UE determines to transmit the SR in response to the content of the HARQ feedback not including a positive acknowledgment (ACK).

14. An apparatus for wireless communication at a user equipment (UE), comprising:
    means for identifying an overlap between resources for transmitting a scheduling request (SR) and a transmission occasion for transmitting hybrid automatic repeat request (HARQ) feedback;
    means for determining which one of the SR or the HARQ feedback to transmit to a base station based on a relationship between a first beam for an uplink control channel for the HARQ feedback and a second beam for downlink communication; and
    means for transmitting the SR or the HARQ feedback based the determination,
    wherein if the relationship is the first beam for the uplink control channel does not follow the second beam for the downlink channel, the HARQ feedback is transmitted.

15. An apparatus for wireless communication at a user equipment (UE), comprising:
    a memory; and
    at least one processor coupled to the memory and configured to:
        identify an overlap between resources for transmitting a scheduling request (SR) and a transmission occasion for transmitting hybrid automatic repeat request (HARQ) feedback;
        determine which one of the SR or the HARQ feedback to transmit to a base station based on a relationship between a first beam for an uplink control channel for the HARQ feedback and a second beam for downlink communication; and
        transmit the SR or the HARQ feedback based the determination,
    wherein if the relationship is the first beam for the uplink control channel does not follow the second beam for the downlink channel, the HARQ feedback is transmitted.

16. The apparatus of claim 15, wherein the UE determines to transmit the HARQ feedback if the first beam for the uplink control channel is not quasi-co-located with the second beam for the downlink communication.

17. The apparatus of claim 15, wherein the UE determines to transmit the SR if the first beam for the uplink control channel is quasi-co-located with the second beam for the downlink communication.

18. The apparatus of claim 15, wherein the second beam comprises a downlink beam for a control resource set (CORESET) monitored for beam failure recovery (BFR) for a secondary cell (SCell).

19. The apparatus of claim 15, wherein the SR comprises a beam failure recovery (BFR) SR.

20. The apparatus of claim 19, wherein the UE determines to transmit the SR further based on a type of the SR being for BFR.

21. The apparatus of claim 15, wherein the UE determines whether to transmit the SR or the HARQ feedback further based on a format of at least one of a physical uplink control channel (PUCCH) for the SR or the HARQ feedback.

22. The apparatus of claim 21, wherein the UE determines whether to transmit the SR or the HARQ feedback further based on the PUCCH for the SR being format 0.

23. The apparatus of claim 21, wherein the UE determines whether to transmit the SR or the HARQ feedback further based on the PUCCH for the HARQ feedback being format 1.

24. The apparatus of claim 15, wherein the UE determines which one of the SR or the HARQ feedback to transmit to the base station based on whether the content of the HARQ feedback includes at least one positive acknowledgement.

25. The apparatus of claim 24, wherein the UE determines to transmit the SR in response to the content of the HARQ feedback not including a positive acknowledgment (ACK).

26. A non-transitory computer-readable medium storing computer executable code for wireless communication at a user equipment (UE), the code when executed by a processor cause the processor to:
identify an overlap between resources for transmitting a scheduling request (SR) and a transmission occasion for transmitting hybrid automatic repeat request (HARQ) feedback;
determine which one of the SR or the HARQ feedback to transmit to a base station based on a relationship between a first beam for an uplink control channel for the HARQ feedback and a second beam for downlink communication; and
transmit the SR or the HARQ feedback based the determination,
wherein if the relationship is the first beam for the uplink control channel does not follow the second beam for the downlink channel, the HARQ feedback is transmitted.

* * * * *